United States Patent [19]

Paetzel et al.

[11] Patent Number: 4,671,321
[45] Date of Patent: Jun. 9, 1987

[54] CONTROL ORGAN FOR GASEOUS AND LIQUID MEDIA

[75] Inventors: Herbert K. Paetzel, Nettetal-Hinsbeck; Rudolf Lindackers, Viersen; Lothar H. M. Grutesen, Nettetal, all of Fed. Rep. of Germany

[73] Assignee: Dresser Industries, Inc., Dallas, Tex.

[21] Appl. No.: 871,696

[22] Filed: Jun. 6, 1986

[30] Foreign Application Priority Data

Jun. 7, 1985 [DE] Fed. Rep. of Germany ....... 3520491

[51] Int. Cl.$^4$ ............................................. F16K 47/04
[52] U.S. Cl. .............................. 137/625.3; 137/625.38; 251/127; 138/43
[58] Field of Search ........... 137/625.33, 625.3, 625.37, 137/625.38; 251/327; 138/43, 46

[56] References Cited

U.S. PATENT DOCUMENTS

| | | | |
|---|---|---|---|
| 2,918,087 | 12/1959 | Curran | 137/625.3 |
| 3,200,842 | 8/1965 | Wilson | 137/625.38 X |
| 3,990,475 | 11/1976 | Myers | 137/625.3 |
| 3,994,315 | 11/1976 | Muller et al. | 137/625.38 X |
| 4,249,574 | 2/1981 | Schnall et al. | 137/625.3 |
| 4,258,750 | 3/1981 | Schnall et al. | 137/625.3 |

Primary Examiner—Arnold Rosenthal

[57] ABSTRACT

A control organ for gaseous and liquid media. Inside of a housing, two shut-off elements are arranged in the passageway of the medium. These shut-off elements are designed as pipes (4, 5) arranged in a manner concentrical in each other and at the cylindrical surfaces in leading manner. In each case, one of the pipes (4) is fixedly connected to the housing, while the other pipe (5) is movable in the longitudinal direction. In specified zones of their cylindrical surfaces, the pipes (4, 5) are provided with passage slots (6, 7) which take a parallel course with respect to each other. The passage slots (6) of the pipe fixedly connected to the housing (1) are at an angle which differs from 0° with respect to the passage slots of the immediately adjacent movable pipe (5). The arrangement of the slots (6, 7) in the spherical surfaces is such that in the closed position, the zones of the spherical surfaces of the two pipes (4, 5) provided with slots (6, 7) do not overlap at any place. When moving one of the pipes (5), the zones of the spherical surfaces, provided with slots, of adjacent pipes overlap increasingly and permit the passage of the medium.

11 Claims, 5 Drawing Figures

CONTROL ORGAN FOR GASEOUS AND LIQUID MEDIA

TECHNICAL FIELD

The invention concerns a control organ for gaseous and liquid media with a housing.

BACKGROUND ART

The invention concerns a control organ for gaseous and liquid media with a housing whose interior space can be connected via two connecting pieces to a media source on one hand and a consuming device on the other hand, wherein two shut-off elements are arranged inside of the housing in the passageway of the medium, one of which is fixedly connected to the housing, while the other one can be displaced with respect to the housing. Such control organs are, for instance, known in a construction as valves. In this case, one of the shut-off elements consists of at least one valve seat, opposite which a movable valve cone is located.

A task frequently to be solved in the case of such valves consists in designing the valve in low-noise manner. This can be done in a known manner, for instance, by arranging noise-dampening elements, such as "hole cages" fixedly in the passageway of the valve. When the valve cone is lifted off, the medium flows through the noise-dampening elements.

Valves with several valve seats and valve cones connected behind one another are also known, wherein by a gradual enlargement of the spaces between the valve seats an expansion of the medium flowing through is achieved.

The disadvantages of the known valves are a relatively high construction and spatial outlay.

The task on which the invention is based consisted of designing a control organ with the characteristics described above and in the preamble of the claims in such a way that at small construction and spatial outlay a high sound attenuation can be achieved at characteristics which can be variably specified. Furthermore, a simple design of expansion spaces is possible and the control organ is as unsensitive as possible to solid materials.

The solution to the design task is as described in Claim 1.

Advantageous forms of embodiment of the control organ of the invention are described in the subdependent claims.

SUMMARY OF THE INVENTION

The basic concept of the invention consists of not primarily using valve seats and valve cones as shut-off elements, but using two or more pipes arranged concentrically into one another. The pipes are provided with slits and can be moved with respect to each other in such a way that in certain positions due to the slotted zones (located opposite each other) of the cylindrical surfaces of the pipes, passageways for the flowing medium are created. Also, due to the special arrangement and design of these pipes, one or several "hole cages" with a variable number of holes are also created. Especially with the arrangement of several such "hole cages" in each other, due to multiple reflection an excellent sound reduction and attentuation is achieved when the medium passes through. In addition, the outflowing medium is swirled in controlled manner into finely structured cross sections of efflux.

The control organ exhibits a number of considerable advantages as compared to customary valve constructions.

Thus, for instance, at the smallest space requirement, the number of steps is extraordinarily variable. Any desired characteristics can be produced, especially linear characteristics independent of the number of steps. As explained farther below with the help of an example of an embodiment, expansion spaces can be created in the individual steps using the smallest space by the corresponding arrangement of slots with regard to their distance and their width. The control organ is extraordinarily unsensitive to solid materials carried along in the medium since only small accelerations occur because of the short passageways. The control organ according to the invention can be produced at a favorable cost of different materials, for instance metal, plastic, porcelain, etc. Also the arrangement of slots instead of holes decreases the cost expenditure as compared to known valves. Also, a soft-sealing arrangement of the pipes within each other is possible.

It goes without saying that in the control organ according to the invention, the design of the shut-off elements in the manner according to the invention can be supplemented by the arrangement of an additional valve seat with a valve cone.

BRIEF DESCRIPTION OF THE DRAWINGS

An example of embodiment of the control organ according to the invention and its operation is explained in more detail below with the help of the attached drawings.

DETAILED DESCRIPTION

Figure 1:
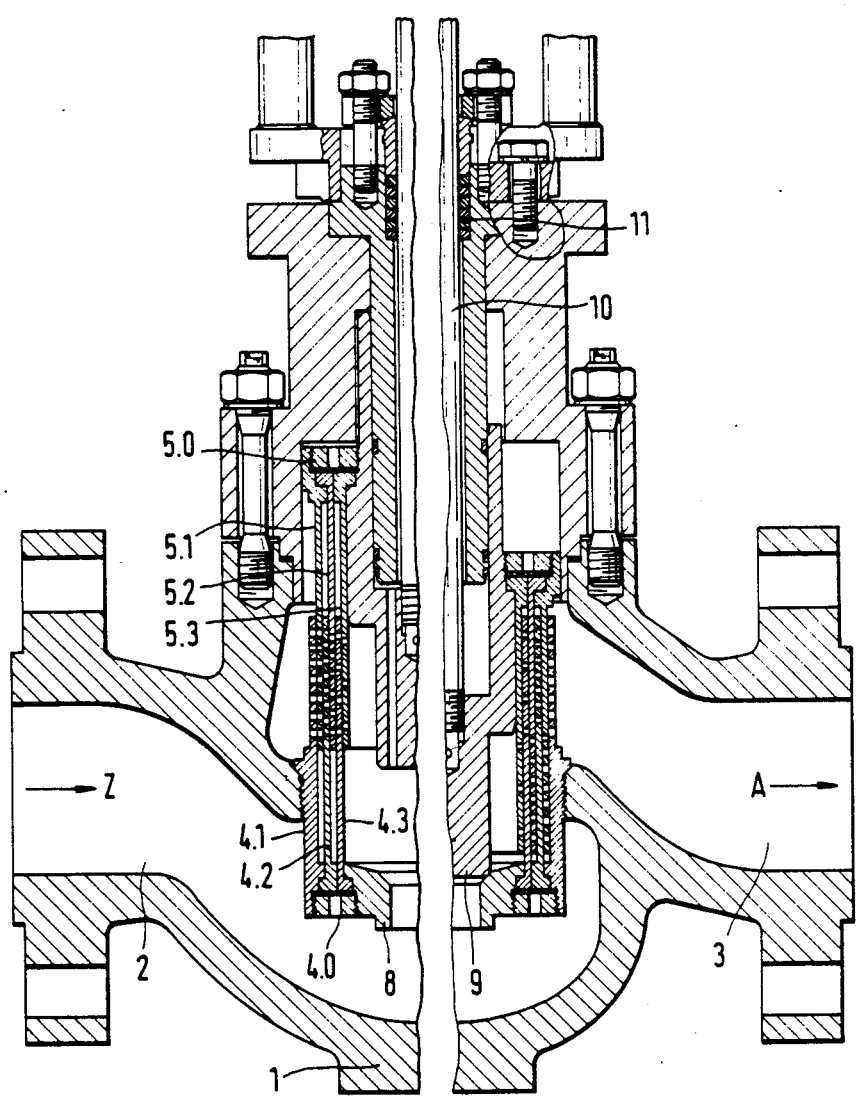
FIG. 1 shows a longitudinal section of a control organ with altogether six pipes arranged concentrically inside of each other as shut-off elements.

The control organ shown in FIG. 1 possesses a housing 1, whose inner space can be connected to a medium source via a connnecting piece 2 which serves as intake Z, and to a consuming device via a connecting piece 3 which serves as outlet A.

In the passageway of the medium, inside of the housing, pipes 4.1, 4.2 and 4.3 are arranged concentrically in each other at distances with respect to each other and at their end facing the inflow side Z, they are fixedly and tightly connected to each other. The outermost pipe 4.1 is inserted tightly and fixedly into an opening inside of housing 1. In their upper half, which is located in the part of the inner space connected to the outlet A, the pipes 4.1 to 4.3 exhibit slots in the cylindrical surface, which will be explained in more detail below.

Concentrically with respect to the pipes 4.1, 4.2 and 4.3 fixedly connected to housing 1, in the interspaces between these pipes, movable pipes 5.1, 5.2, 5.3 are arranged, which at their end being the upper end 5.0 in FIG. 1 are fixedly and tightly connected to each other. As can be seen, the pipes 5.1, 5.2 and 5.3 can be inserted from above between pipes 4.1, 4.2 and 4.3 and pulled out again. The pipes 5.1 to 5.3 are fixedly connected with a lifting spindle 10, which passes out of the housing 1 via packing 11.

In FIG. 1, the part arranged on the right-hand side with respect to the center axis of the lifting spindle 10 shows the control organ in the closed state, while the part arranged on the left-hand side with respect to the lifting spindle 10 shows the control organ in the open state.

At the end in FIG. 1 being the lower end of pipes 4.1, 4.2, 4.3, inside of the innermost pipe 4.3 a valve seat 8 is arranged, opposite which a valve cone 9 connected to the lifting spindle 10 is located. The valve cone 9 can be moved together with the movable pipes 5.1, 5.2, 5.3 and sits on the valve seat 8 in the closed state of the control organ.

By means of the representation of FIGS. 2 to 5, the more exact design of the slots in pipes 4.1 to 4.3 and 5.1 to 5.3, as well as the operating manner of the control organ, will now be explained in more detail.

It can be seen from FIG. 1 in combination with FIGS. 2 to 5, that the pipes 4.1 to 4.3 fixedly connected to the housing exhibit passage slots only in their upper half, while the movable pipes 5.1 to 5.3 exhibit slots only in their lower half.

For the sake of simplification of representation, in FIGS. 2 to 5, only one pipe 4 fixedly connected to the housing and one pipe 5 movable in the longitudinal direction have been shown. The pipe 4 fixedly connected to the housing 1 possesses passage slots 6, while the movable pipe 5 located inside of pipe 4 exhibits passage slots 7. The passage slots 6 of pipe 4 are arranged at regular distances with an angle of approximately 45° with respect to the surface lines. The slots 7 of the inner movable pipe are arranged at equal distances with an angle with respect to the surface lines which likewise amounts to about 45°, but exhibits opposite signs. The slot bands of the two pipes 4 and 5 located inside of each other thus intersect at an angle of about 90°.

Figure 2:
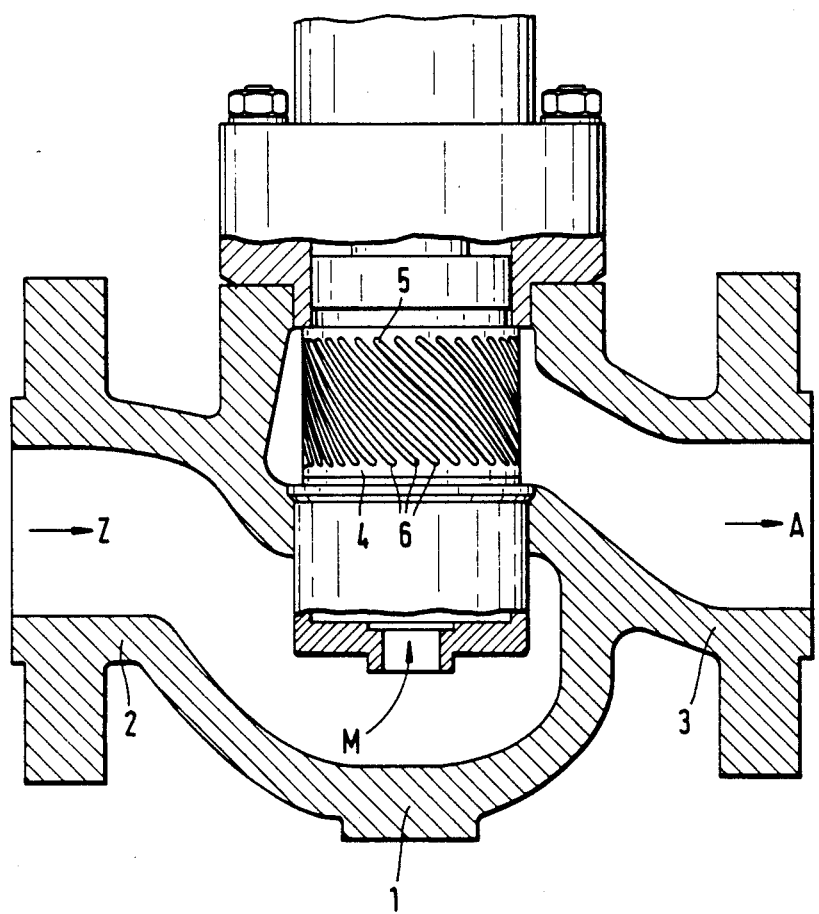
FIGS. 2–5 show the control organ according to FIG. 1 in the closed position and in several opening positions.

In FIG. 2, the control organ is in the closed position, in which the movable pipe 5 has been inserted entirely to the bottom into pipe 4 fixedly connected to the housing. In this position, the slots 6 of pipe 4 are located opposite the closed parts of the cylindrical surface of pipe 5, while the slots 7 (not visible in FIG. 2) of pipe 5 likewise are located opposite closed parts of the cylindrical surface of pipe 4. A passage of the medium entering from below in direction M into the inner pipe 5 and its exit from slots 6 in the direction of outlet A is not possible.

Figure 3:
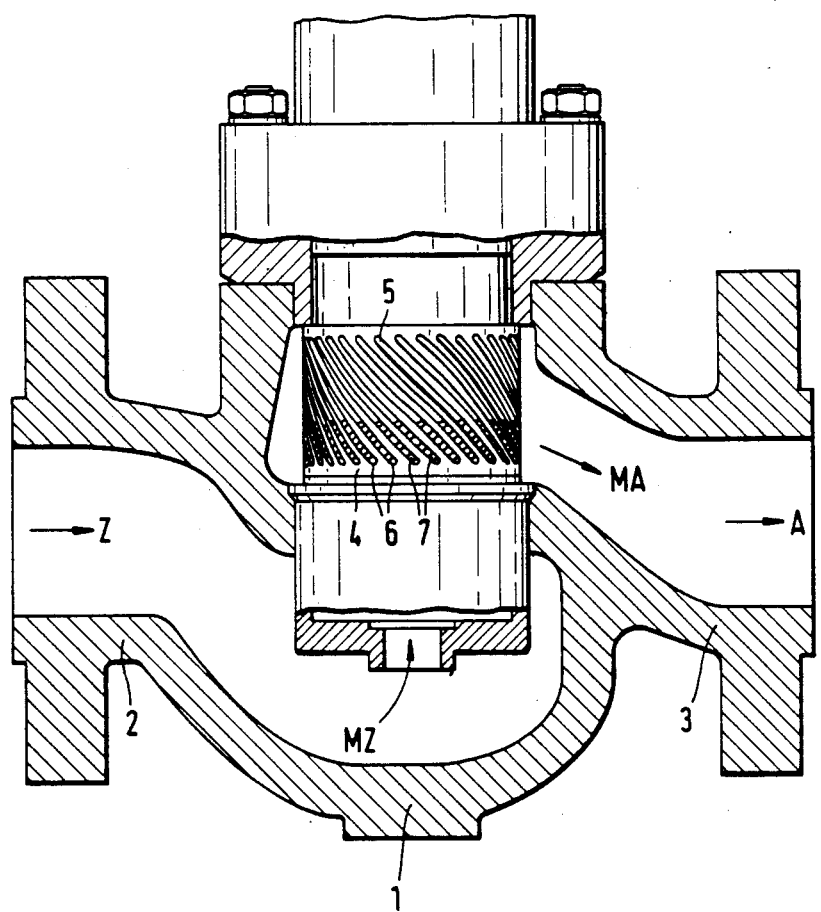

In the position of the control organ shown in FIG. 3, the inner pipe 5 has been displaced upwards so far that the zones of the cylindrical surfaces of pipes 4 and 5 provided with slots overlap for about a third of the way. As immediately visible, by the cutting of slots 6 and 7, openings between the inner space of pipe 5 and the outer space of pipe 4 are formed, so that the medium entering in direction MZ into the inner space of pipe 5 can emerge into the outer space of pipe 4 in direction MA and flow out to outlet A.

Figure 4:
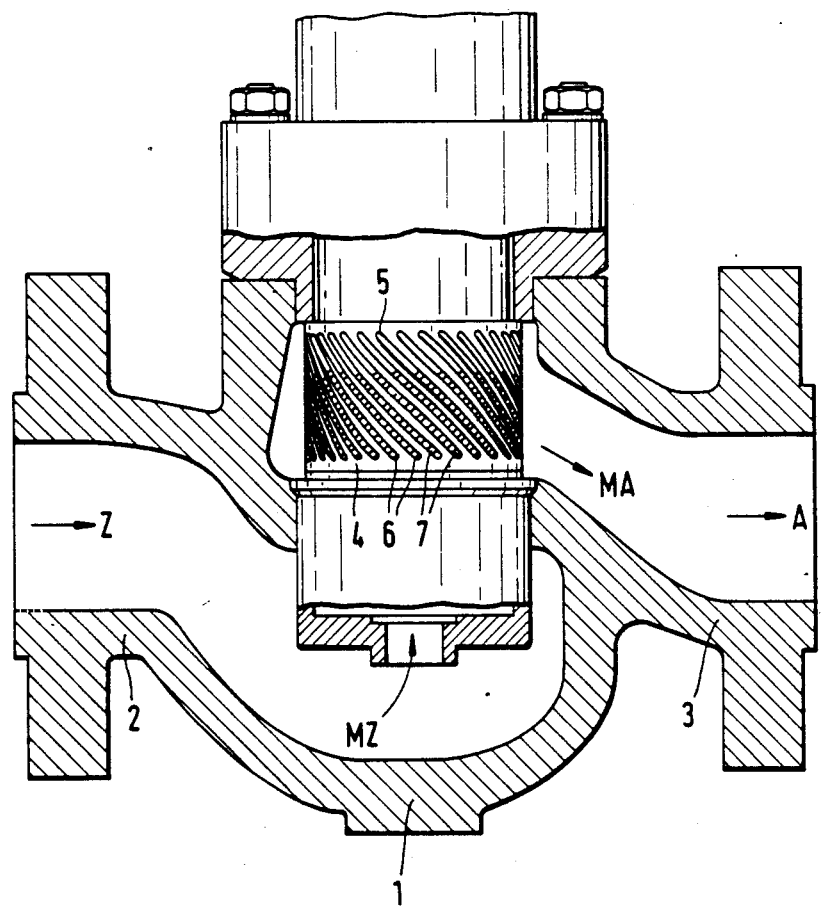

In FIG. 4, pipe 5 has been pulled out of pipe 4 to such a distance that the zones of the cylindrical surfaces of the pipes provided with slots overlap for about two thirds of the way and correspondingly more medium can flow out in the direction to the outlet A.

Figure 5:
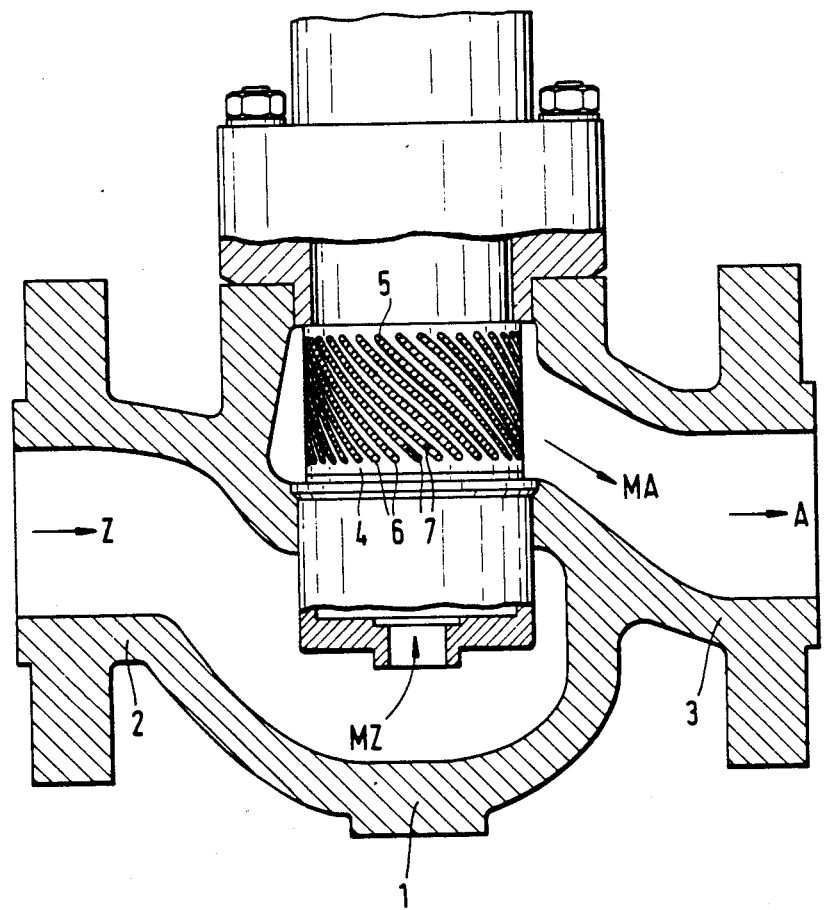

In FIG. 5, the inner pipe 5 has now been pulled out to such a distance that the zones of the cylindrical surfaces provided with slots overlap completely. Now the maximum state of opening has been reached and the medium can flow into the inner pipe 5 in direction MZ and flow out of the outer pipe 4 in direction MA, in direction to the outlet A.

The process described by means of FIGS. 2 to 5 likewise occurs in the control organ shown in more detailed fashion in FIG. 1. In doing so, in the shut-off elements shown in FIG. 1, the slots in the pairs of pipes associated with one another 4.1–5.1, 4.2–5.2 and 4.3–5.3 can be arranged quite differently in each case. Thus, for instance, in a manner not shown separately, the width of the slots can increase going from the inside towards the outside, or the slot distances can decrease going from the inside towards the outside. In this manner, expansion spaces widening in the direction of flow are created.

Furthermore, it is possible to arrange the slots in more than one pair of pipes in such a way that in no position of the inner pipes 5.1 to 5.3 unimpeded passageways are formed in the radial direction, by arranging several openings created by the crossing of slots directly behind each other.

In the closed state, the passageway in the control organ shown in FIG. 1 is additionally blocked by the valve cone sitting on the valve seat 8.

It is hereby achieved that the pairs of pipes associated with one another 4.1–5.1, 4.2–5.2, and 4.3–5.3 need to be arranged in close proximity at their cylindrical surfaces, but not necessarily in completely sealing manner inside of one another.

When doing without the additional valve seat and valve cone, if the occasion arises the pipes have to be arranged in a sealing manner inside of each other at the cylindrical surfaces in order to ensure complete blocking in the closed state.

We claim:

1. In a control organ for a gaseous and liquid media with a housing whose interior space can be connected via two connecting pieces to a media source on one hand and a consuming device on the other hand, wherein two shut-off elements are arranged inside of the housing in the passageway of the medium, one of which is fixedly connected to the housing, while the other one is displaced with respect to the housing, the improvement which comprises:

at least two concentric pipes which serve as shut-off elements, at least one of the pipes being fixedly connected to the housing and at least one of the pipes being movable in the longitudinal direction, the pipes being arranged in the housing so that the outer space of the outermost pipe is connected to one of the connecting pieces and the inner space of the innermost pipe is connected to the other one of the connecting pieces and in specified zones of their cylindrical surfaces all pipes exhibit passage slots taking a parallel course with respect to each other, the passage slots in the pipe fixedly connected to the housing being at an angle which differs from 0° with respect to the passage slots of an immediately adjacent movable pipe and the arrangement of the slots on the cylindrical pipe surfaces is such that in a closed position, the zones of the cylindrical surfaces provided with slots of each of the pipes fixedly connected to housing are located opposite closed zones of the cylindrical surface of the adjacent movable pipe and on whose displacement the zones of adjacent pipes provided with slots increasingly overlap.

2. A control organ according to claim 1, wherein: the slots of one of the pipes fixedly connected to the housing forms an angle with the surface lines of the pipe whose amount differs from 0° or 180°, and the slots of the immediately adjacent movable pipe form an angle of the same amount with the surface lines of that pipe, but with opposite sign.

3. A control organ according to claim 1 wherein the spacings of the slots in adjacent pipes are different.

4. A control organ according to claim 3, wherein the spacings of the slots in adjacent pipes decrease in the direction of flow.

5. A control organ according to claim 1 wherein:
the widths of the slots of adjacent pipes increase in the direction of flow.

6. A control organ according to claim 1, wherein the direction of flow in the pipes takes place from the inside towards the outside.

7. A control organ according to claim 2, wherein:
the amount of the angle which the slots form with the surface lines of the pipes is between 30° and 60°.

8. A control organ according to claim 7, wherein:
the amount of the angle which the slots form with the surface lines of the pipes is about 45°.

9. A control organ according to claim 1, wherein:
the pipes are arranged in a concentric manner in one another are sealingly engaged at the cylindrical surfaces.

10. A control organ according to claim 1, wherein:
the open end of the innermost pipe fixedly connected to the housing has a valve seat opposite which a valve cone is located, the valve cone being arranged concentrically with respect to the innermost of the movable pipes and movable with the movable pipes.

11. A control organ according to claim 1, wherein:
when more than two concentric pipes are present, the spacing and arrangement of the slots on the cylindrical surfaces of the pipes so differ that passageways passing through all pipes in the radial direction are not formed in any position of the movable pipes.

* * * * *